United States Patent [19]
Woodward et al.

[11] Patent Number: 5,579,852
[45] Date of Patent: Dec. 3, 1996

[54] SOIL WORKING TOOL

[75] Inventors: John W. Woodward, Toowoomba; Norman J. Hando, Sheldon, both of Australia

[73] Assignee: Pegasus Technologies Pty Ltd., Toowong, Australia

[21] Appl. No.: 358,799

[22] Filed: Dec. 19, 1994

[30] Foreign Application Priority Data

Dec. 23, 1993 [AU] Australia ................... PM3192

[51] Int. Cl.⁶ .................................. A01B 15/02
[52] U.S. Cl. ................ 172/721; 172/753; 172/762
[58] Field of Search ................ 37/448, 449, 450, 37/451, 452, 454; 172/699, 719, 721, 753, 762

[56] References Cited

U.S. PATENT DOCUMENTS

| | | | |
|---|---|---|---|
| 898,419 | 9/1908 | Allen | 172/721 |
| 1,108,600 | 8/1914 | McCulley et al. | 172/721 |
| 3,648,391 | 3/1972 | Kabay et al. | 37/451 |
| 4,333,536 | 6/1982 | Ryan | 172/721 |
| 4,794,992 | 1/1989 | Loch | 172/721 |

*Primary Examiner*—Terry Lee Melius
*Assistant Examiner*—Robert Pezzuto
*Attorney, Agent, or Firm*—Flehr, Hohbach, Test, Albritton & Herbert; Donald N. MacIntosh, Esq.

[57] ABSTRACT

A soil working tool in the form of a streamlined tool 10 having a concave ridge-like edge 11 extending along a major portion of the length of the tool and being equipped with recessed holes 12 and 13 so the tool can be secured to a shank. The tool has a relatively narrow deep body including a leading toe section 14 which is square and bevelled at 15. The body diverges rearwardly to a heel 16 and the ridge-like edge 11 is upright and inclined rearwardly and extends from a point 17 in close proximity to the toe section 14 for the full length of the tool to an upper end 18.

The ridge-like edge is initially shallow and then has a relatively pronounced change in inclination about one third the way along the ridge-like edge but is still generally monotonically curved to provide a uniform action over the length of the tool.

20 Claims, 5 Drawing Sheets

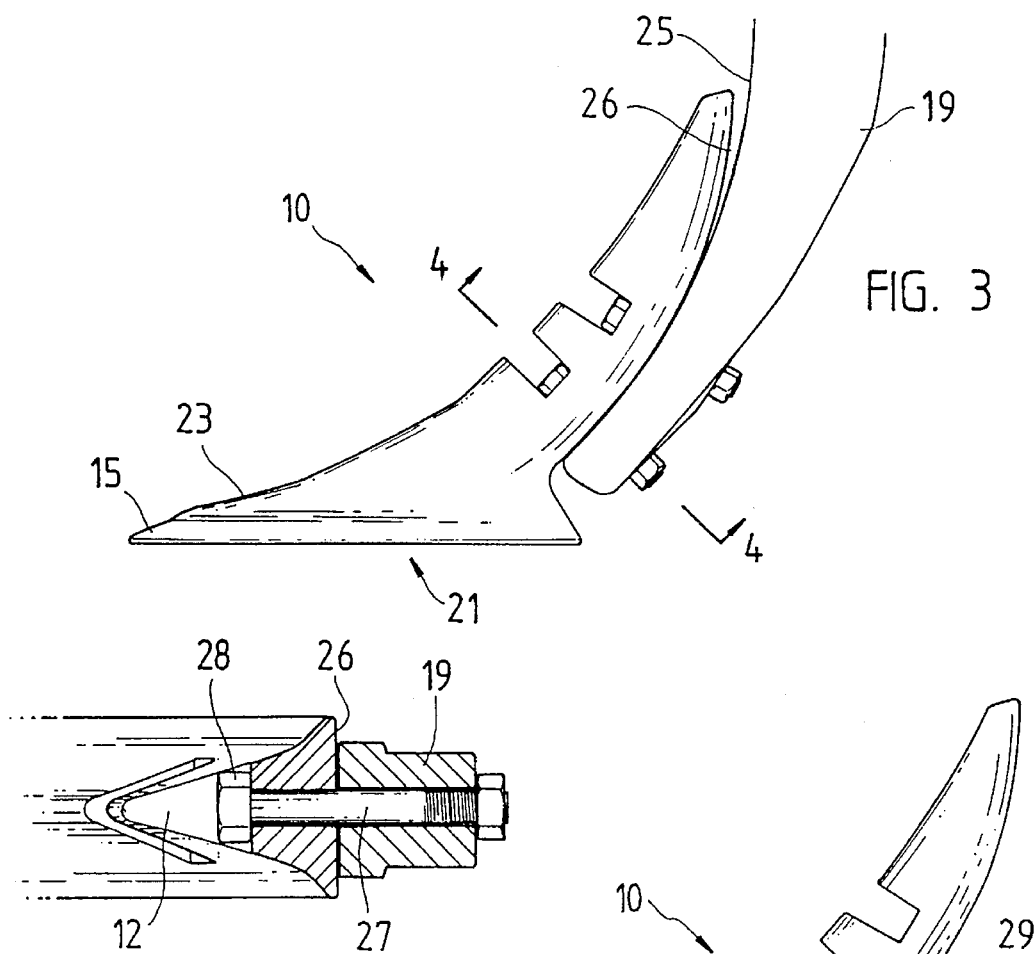
FIG. 3
FIG. 4
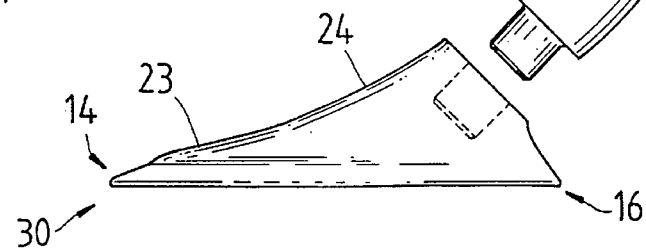
FIG. 5
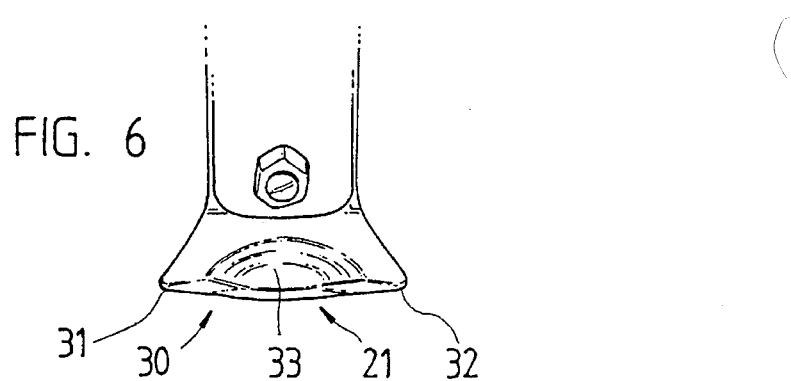
FIG. 6

SOIL WORKING TOOL

THIS INVENTION relates to a soil working tool and in particular, but not limited to a tool suited for a plough employing a shank fitting according to the American Society for Agricultural Engineers standard design.

At present, the invention has as its primary object to reduce power consumption by reducing draught and at the same time improve tillage by reducing soil inversion.

Typical prior art soil working tools are described in the following patent specifications: GB2209651; GB2232568; AU19021/88; AU83962/75; and 42021/85.

All of these specifications describe soil working tools having various shapes but in all cases the present invention as described and claimed herein provides reduced power consumption while at the same time providing improved tillage.

The present invention achieves its objects by providing in one preferred form a soil working tool comprising a streamlined curve shaped body having a concave ridge-like edge extending along a major portion of the length of the body and being equipped with means for removably securing the tool to a shank comprising spaced recessed through holes located about midway along the ridge-like edge.

In another preferred form there is provided a soil working tool comprising a streamlined curved body having a relatively wide rear portion and a longitudinally extending concave centrally disposed relatively narrow upright ridge-like front edge, the ridge-like edge extending substantially monotonically rearwardly and upwardly along a major portion of the length of the body, the body being equipped with means for securing the rear portion of the tool to a shank so the tool extends marginally outside of and covers a front lower end portion of the shank, the body having a lower portion comprising a leading toe section diverging rearwardly and generally horizontally to a relatively broad heel, an upper section above the heel and bilateral transversely curved concave side faces extending from the ridge to the rear portion.

In a further aspect, the present invention resides in a soil working tool having a relatively narrow deep body including a leading toe section diverging rearwardly to a heel, the tool having an upper end portion above the heel and having an upright inclined rearwardly extending ridge-like edge extending from a position at or adjacent to the toe section to a position at or adjacent to the upper end of the tool, the ridge-like edge in use being disposed in a vertical plane with the toe section merging into the ridge-like edge so that as the tool advances through the soil, the toe section and ridge-like edge co-act to simultaneously fracture the soil and give rise to a zone of vertical breaking in the soil above the toe section and about which the soil is progressively divided by the ridge-like edge as the tool advances through the soil.

The tool preferably possesses a complex three dimensional shape having an arcuate shaped body possessing a longitudinally extending curved ridge-like edge and arcuate side surfaces. For this reason, the tool is preferably cast so that the desired shape can be readily and economically achieved.

The recessed through-holes are preferably formed as spaced transverse slots extending across the ridge-like edge so that the slots have opposed upwardly tapered side walls extending from a wide base wall to the ridge-like edge, the base wall of each slot having a through hole so that bolts passing through the holes and used to secure the tool to the shank have their heads protected by the side walls of the slots as the tool advances through the soil.

The toe section can be rounded or square but is preferably bevelled as a lead-in to assist the tool entering the soil. The heel is typically the widest part of the tool so that in inverted plan, the tool has a generally narrow frustum-like shape.

The ridge-like edge preferably extends over a major portion of the length of the tool and preferably extends from the toe section or from a location in close proximity to the toe section to a point at or adjacent to the upper end of the tool.

The ridge-like edge preferably has two relatively distinct changes of slope along its length from a relatively low incline capable of providing an upward fracturing force, to a relatively steep incline providing a dividing action to the flow of the already fractured soil.

In a particularly preferred form, the upper end of the tool preferably extends a relatively short distance along the shank as a trade off against the amount of material used in the tool in proportion to the reduced benefit of having the ridge-like edge extend high up on the shank.

The tool is typically used with a shank having an arcuate or curved front surface. The tool in this case includes a curved rear surface which bears against the front surface of the shank. The rear surface of the tool is preferably a curved surface having a curvature equal to or greater than the curvature of an existing shank known in the art so that the tool can be fitted to a range of shanks of different curvature.

The tool is typically just wide enough to cover the shank along a major portion of the length of the surface which bears against the shank to provide wear protection for the shank.

The tool is preferably tapered from a front bevelled section in front of the ridge-like edge to a wider rear portion adjacent to the heel and includes side surfaces sweeping rearwardly on each side of the ridge-like edge, the side surfaces being preferably concave and having leading portions extending generally in the direction of travel of the tool so that the side surfaces at the front thereof extend in the direction of travel and then concave outwardly and rearwardly.

In another aspect, the invention also provides the combination of a shank plus a tool as described, where a lower surface of the tool is set parallel to the horizontal or up to an angle of 5° to the horizontal and preferably at 4° to the horizontal.

The tool typically includes an undersurface of the tool having a cut-out so that as the tool wears, the undersurface of the tool does not adopt a convex shape that would adversely affect operation.

Typically, the heel includes rear outer side edges of the undersurface of the tool which are angled to the horizontal so that the tool maintains its shape as the tool wears.

It will be appreciated from the foregoing that the tool according to the present invention works soil in a particularly advantageous manner. Accordingly, the present invention also embraces working of soil using a tool on a plough, the tool having a leading toe section and an arcuate vertically disposed ridge-like edge trailing behind the toe section, the tool causing an initial lifting of soil and creating a zone of vertical breaking in the soil as the tool advances through the soil, the ridge-like edge following the toe section dividing the soil along the zone of vertical breaking either side of the ridge-like edge.

In a further aspect, the tool is preferably double ended so that when one end has worn, the tool can be reversed and the other end used. In his sense, the tool has opposite toe sections and adjacent confronting heel sections with a central bridging portion, the bridging portion having a shank attachment means so the tool can be reversibly mounted to a shank. In this case, cut-out portions on the underside of the tool adjacent to each heel of the double ended tool straddles the shank so that the curved rear surface can bear securely against the curved portion of the shank to which it can be mounted. In all other respects, the toe, heel and ridge-like edge of each end are as described in relation to the single ended tool and ostensibly operate the same way.

In order that the present invention can be more readily understood and be put into practical effect, reference will now be made to the accompanying drawings which illustrate preferred embodiments of the present invention and wherein:

FIG. 3 is a side view illustrating a further embodiment of the present invention;

FIG. 4 is a section through 4—4 of FIG. 3;

FIG. 5 is a second embodiment of the present invention;

FIG. 6 is a rear view of part of a soil working tool according to the present invention fitted to a shank;

Figure 1:
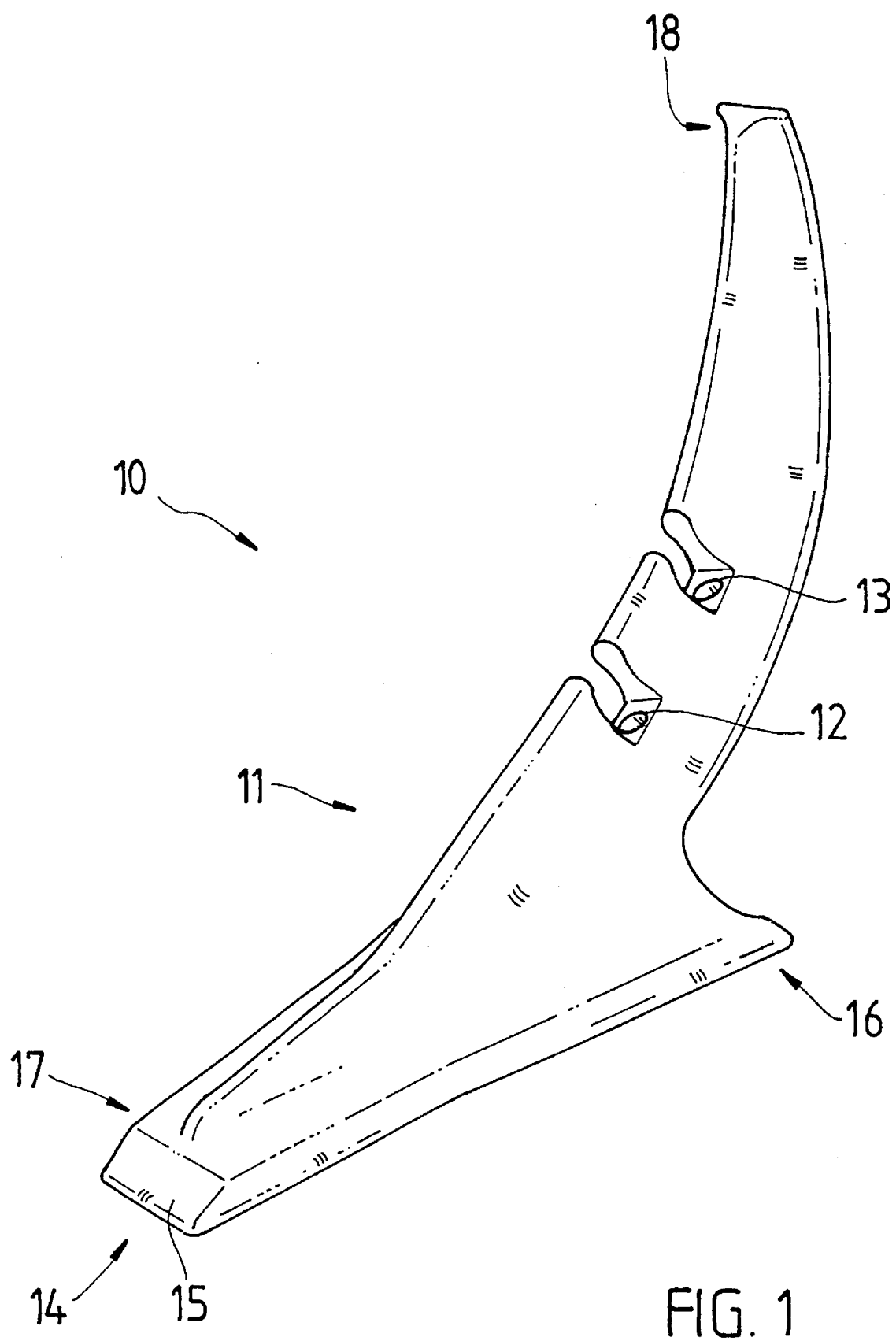
FIG. 1 is a perspective view of a soil working tool according to the present invention.
Figure 2A:
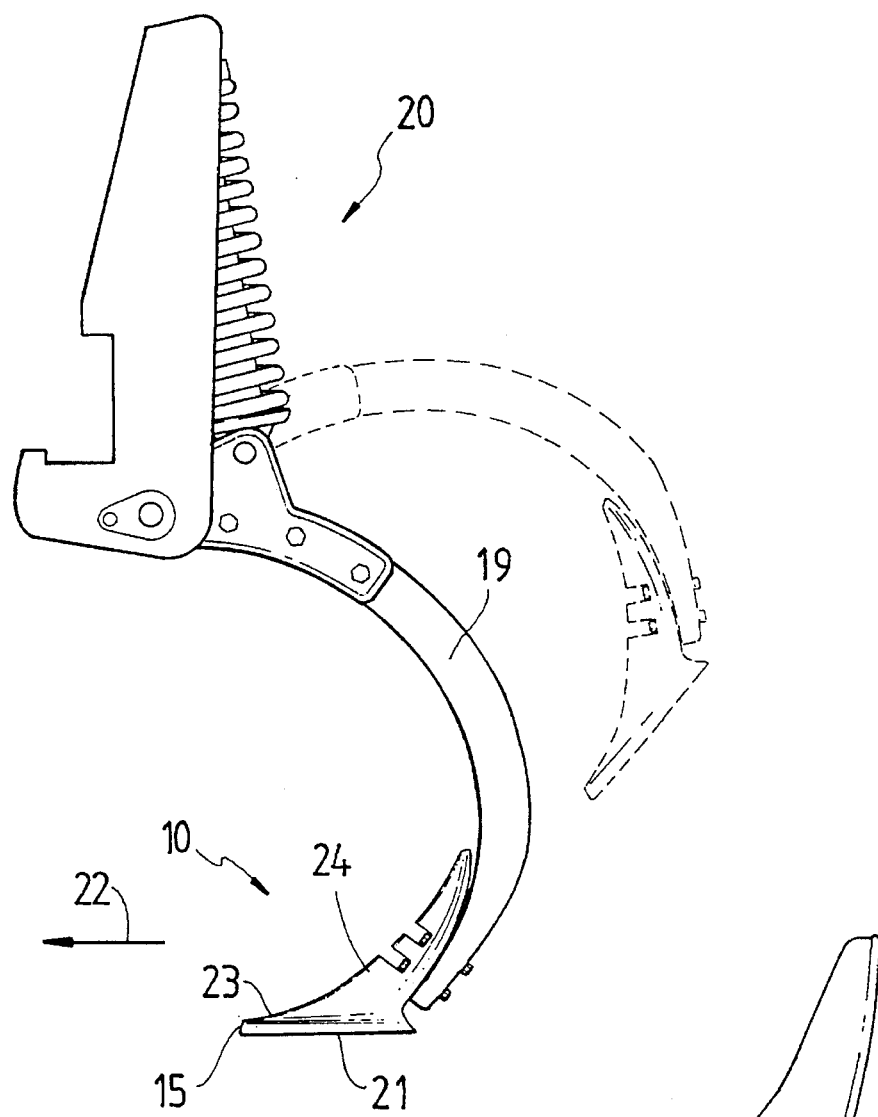
FIGS. 2A and 2B are side views illustrating normal use of a soil working tool according to the invention on a spring biased plough shank with FIG. 2B being a close up showing the positioning of the tool relative to the horizontal.

Referring to the drawings, there is illustrated a soil working tool in the form of a streamlined tool 10 having a concave ridge-like edge 11 extending along a major portion of the length of the tool and being equipped with recessed holes 12 and 13 so the tool can be secured to a shank (see FIG. 2A).

The tool has a relatively narrow deep body including a leading toe section 14 which is square and bevelled at 15. The body diverges rearwardly to a heel 16 and the ridge-like edge 11 is upright and inclined rearwardly and extends from a point 17 in close proximity to the toe section 14 for the full length of the tool to an upper end 18.

The ridge-like edge is initially shallow and then has a relatively pronounced change in inclination about one third the way along the ridge-like edge but is still generally monotonically curved to provide a uniform action over the length of the tool.

Figure 2B:
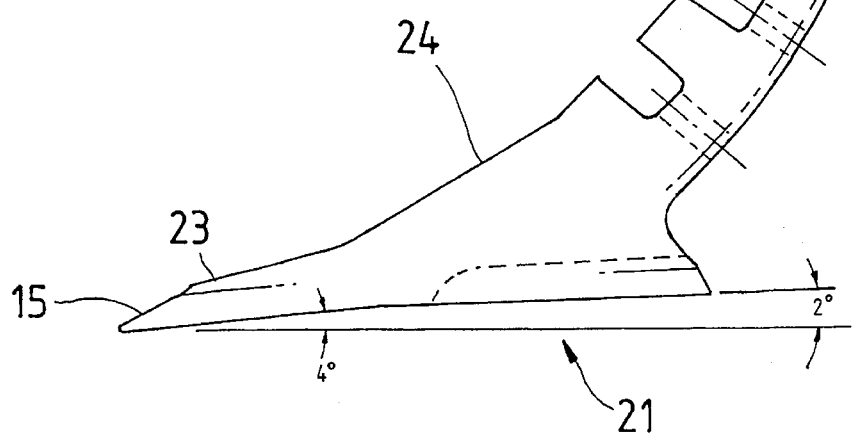

Referring now to FIGS. 2A and 2B, the tool 10 is illustrated fitted to a shank 19 of a plough 20 and as can be seen, the lower surface 21 of the tool is almost horizontal and in this case set at a 4° incline at the toe section to the horizontal and a 2° incline through to the heel. This particular geometry has been found to be useful in reducing draught and soil inversion. The ridge-like edge also has changes in inclination along its length.

The action of the tool occurs as the tool is caused to advance in the direction of the arrow 22 with the leading toe section 15 initially fracturing the soil while the closely spaced leading ridge-like edge 23 co-acts with the toe section causing an initial lifting and fracturing of the soil while creating a zone of vertical breaking providing a vertical plane of fracture in the soil whereafter the ridge-like edge section 24 divides the soil along the narrow vertical breaking zone as the tool advances.

FIG. 3 illustrates a further feature of the present invention, and as can be seen, the shank 19 has a curved surface 25 and the tool 10 includes a curved rear surface 26 which is of slightly greater curvature in this case than the shank 19. Shanks are available which have varying curvature and for this reason, the rear surface 26 is set to a typical shank of the kind having the greatest curvature available. Under these circumstances, the chisel point 10 can fit a variety of different shanks.

The shank 19 includes hole spacing common to shanks made according to the American Society for Agricultural Engineers standard design and for this reason, the illustrated embodiment fits most shanks.

FIG. 4 illustrates further aspects of the present invention which relate to wear and removability of the tool from the shank. The section of FIG. 4 shows a bolt 27 located in the recess 12 and as can be seen, the recess 12 is deep enough so that walls of the recess protect the bolt head 28 from being damaged. Likewise, the rear surface 26 of the chisel point is sufficiently wide to protect the shank and therefore reduce shank wear.

FIG. 5 is a further embodiment where the tool 10 comprises an adaptor 29 and a foot section 30 welded or otherwise secured to the adaptor. The foot section 30 embraces the heel 16, toe section 14 and main wear regions 23 and 24. As major wear occurs at the foot section 30, foot sections can be replaced using this embodiment.

As the major wear occurs in the foot section 30, the foot has been specifically designed to maintain the above-described soil working characteristics as the foot 30 wears. One aspect of this is illustrated in FIG. 6. As can be seen in FIG. 6, the edges 31 and 32 of the foot 30 include angled marginal regions and the undersurface 21 includes a cut-out region 33 extending from the heel 16 forward towards the toe section 14. It will be appreciated that as the edges 31 and 32 wear, the volume of the cut-out region 33 will be reduced but the foot 30 will still substantially maintain its original shape as far as its operation is concerned. For example, if the cut-out 33 was not there and the tool commenced with a completely flat surface then the surface 21 would develop convexity as the outer edges 31 and 32 were subjected to wear. This would adversely affect the operation of the tool.

The basic principles of the present invention have been described above.

Figure 7:
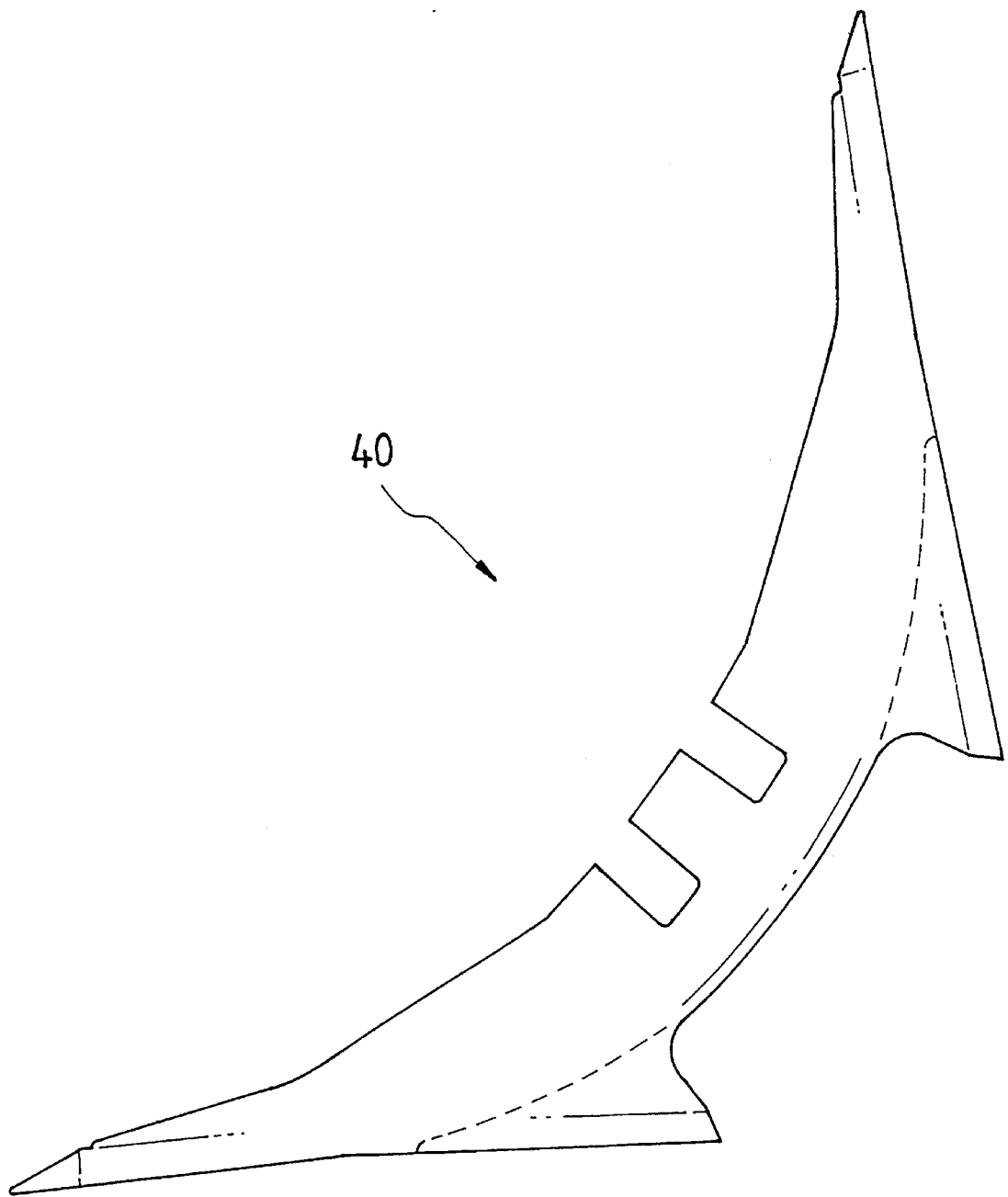
FIG. 7 is a perspective view of a double ended tool according to the present invention.

The embodiment of FIG. 7 illustrates a reversible double ended tool 40. Each end of the tool 40 operates the same as the single ended tool already described, so like numerals have been used to illustrate like features.

Apart from being double ended, the only other major difference is that the cut-out portions adjacent the heel of each end form channels housing the shank.

Figure 8:
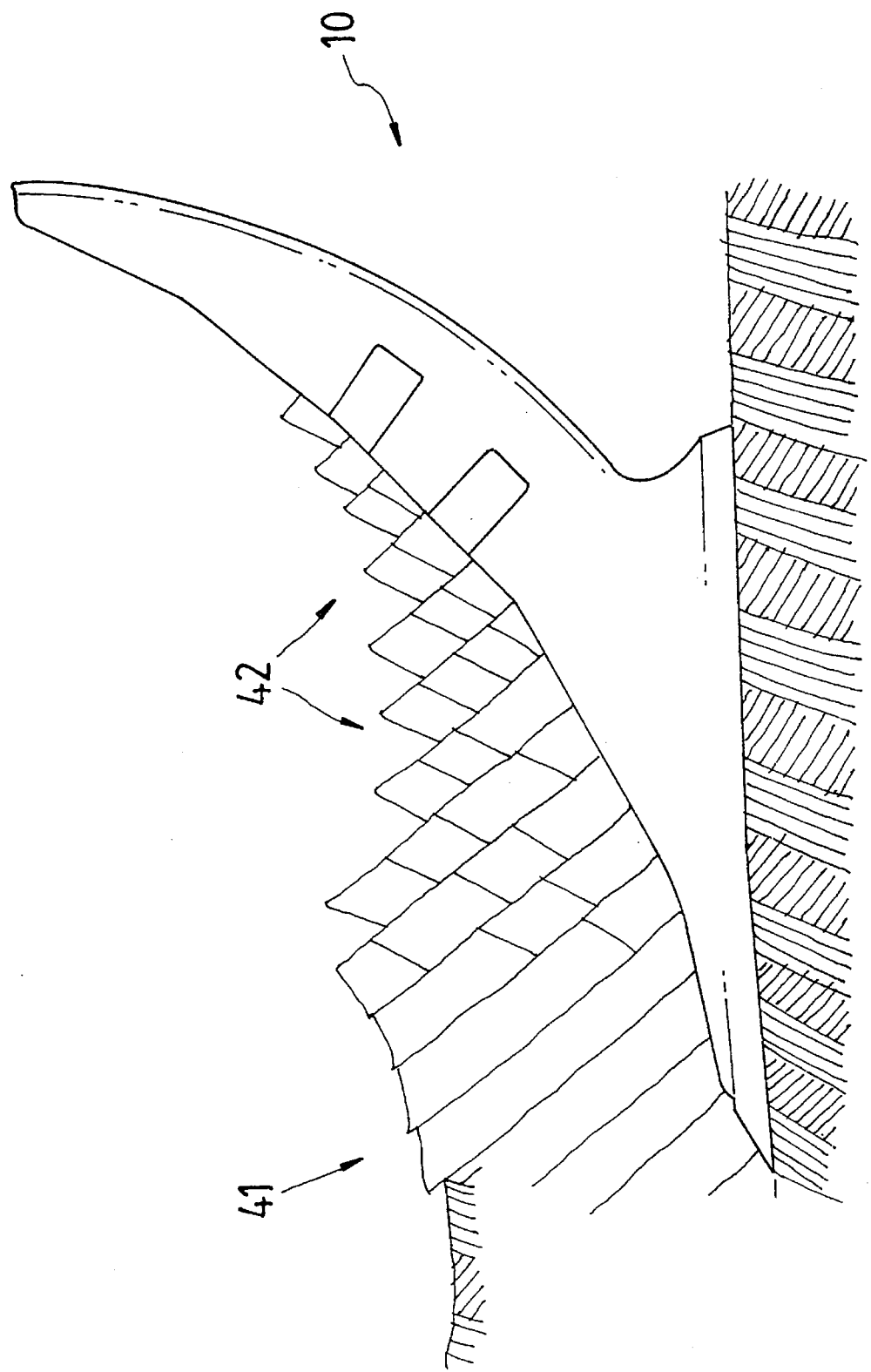
FIG. 8 is a side view illustrating operation of a double ended soil working tool according to another preferred embodiment of the present invention.

FIG. 8 shows the tool in operation and this operation of the tool also applies in relation to previously described embodiments.

The diagram shows the effect of the tool passing through the soil, whereby because of shear failure in the soil at 41, soil blocks are forced upwards initially and then to the side at 42.

With its unique complex three dimensional cast shape, the tool creates a vertical breaking effect in the soil by creating planes of fracture in the soil above the toe section of the tool.

The shape and angle of the tool's top surface contributes to reduction in draught. However, the low draught comes also from minimising the "rubbing" effect on the soil surface below the tool, and by reducing the area of contact or "print" of the tool on the ground.

This result is achieved in the illustrated embodiments by having:

(a) the 4° angle to the horizontal of the underside of the toe section of the tool;

(b) the angled underside of the outer edges running from the toe to the heel; and (c) the concave sides of the ridge-like edge which runs from front to rear on the top surface.

The design of these surfaces creates a "shadow" effect which reduces the area of the tool in contact with the soil flowing past, thereby reducing draught and wear. The design ensures that there is plenty of material in the areas of greatest wear to provide satisfactory working life. Strategic placement of hard facing or some similar method of localised hardening can be employed to increase wear resistance in some field conditions.

The ridge-like edge has a changing angle along its length to provide the optimum breaking of the soil and the splitting of its flow around the supporting shank, while achieving minimal inversion.

The double ended version of the tool illustrated in FIG. 7 provides for greater life per unit of cost.

In the illustrated embodiment described, all the tool surfaces except the rear surface are designed to interact with the adjacent soil with particular contact characteristics.

The toe section is designed to put increasing upward pressure on the soil until a wedge shaped slice of soil is fractured upwards. As the toe section moves forward, a series of wedge shaped slices of soil are burst upwards as shown in FIG. 7.

The angled ridge-like edge which starts just behind the toe section, progressively lifts each soil slice upwards and in doing so creates a second series of vertical fracture planes at right angles to the first series. The upper edge of this ridge-like edge is sized to provide optimum fracturing of the soil mass, being not so sharp as to cut through the soil without a sufficiently wide band of lifting and breaking of the soil nor so blunt as to cause too much disturbance, mixing or inversion of the soil or drag on the tool. This particular shape of the edge of the ridge-like edge also contributes to its resistance to wear.

The continuation of this ridge-like edge in a modified arc upwards and to the rear provides a continuously applied and increasingly penetrating upward force, so that the ridge-like edge continuation progressively penetrates the fractures zone initiated by the most forward part of the ridge-like edge, so enabling that part of the ridge-like edge at the upper rear of the tool to move forward through the soil to complete the breaking action with minimal mixing and inversion of the soil and drag on the tool.

The sides of the ridge-like edge are concave so that, following the initial bursting action of the edge of the ridge-like edge, the ridge-like edge parts the soil with an increasing rate of displacement as it passes across the surface of the ridge-like edge and as the soil becomes more loosened due to the overall effect of the tool. In this way, the concave shape minimises the drag on the tool.

The upper and lower surfaces of the toe sections of the tool are angled upwards to the rear at about 4° to maintain a maximum downward pressure on the leading edge of the tool for effective penetration of the toe section of the tool and to minimise any tendency of the tool to rise out of the ground.

The underside of the outer edges running from the toe section to the heel is angled up towards the centre, and the underside of the heel section is scalloped out to maintain maximum pressure on these edges, which are relatively narrow in plan in order to maximise downward penetration to reduce drag on the underside of the tool and to maintain these characteristics as the tool wears.

The outer side edges of the tool are splayed sufficiently to provide a balance between providing an increasing lateral force on the soil at the base of the soil wedges to widen the fracture zone without unduly increasing the drag on the tool.

The contact effects on the soil mass of all the surfaces of the tool, as described above, interact to provide a mosaic of effects which result in loosening of the soil by means of a breaking pattern in the soil mass with minimal mixing and inversion of the soil and drag on the tool.

The soil is thus broken into relatively regular shaped blocks of medium size with plenty of interspaces between the blocks. This leaves the soil in a condition which provides storage space for infiltrating moisture, promotes aeration of the soil and encourages microbial activity and soil nitrogenation by natural processes.

The surface appearance of the soil after working with this tool compared with other tools employing their standard operational methods, is that the blocks of soil are more uniform in size and more regular in shape (of the order of a 50 mm cube but of course this is dependent on soil type and moisture content). With the present invention there is much less of a residual trough in the soil surface along the line of the tool's action. Draught on the tractor is reduced by about 30% by comparison with that required for standard chisel points of the type fabricated by curving flat steel bar; and by 10–20% by comparison with that required for other cast chisel points, depending on their angle of penetration into the soil.

One major difference in the working process of a tool according to the present invention, is the continual progressive working action on the soil along the full length of the tool. Other cast tools give a discontinuity in the working action because of abrupt changes in angle between the toe section and the separate and near vertical shin guard designed to protect the front of the shank in prior art tools.

It will be appreciated from the foregoing that the above has been provided by way of illustrative example of the present invention, many variations and modifications thereto will be apparent to those skilled in the art without departing from the broad ambit and scope of the invention as defined in the appended claims.

We claim:

1. A soil working tool operatively secured to a front surface of an upright shank and comprising a streamlined curve shaped elongate body having a longitudinally extending concave narrow upright ridge extending along a major portion of the length of the body backward and upward to a point above a clearly defined heel, the tool having curved faces extending rearwardly either side of the ridge and the side faces being adapted to progressively displace soil either side of the tool and the tool being equipped with means for removably securing the tool to the shank comprising longitudinally spaced recessed through holes located about midway along the ridge.

2. A soil working tool working tool according to claim 1 including a lower surface set at an angle of not more than 5° to the horizontal.

3. A soil working tool according to claim 1 wherein the tool includes an undersurface having a centrally disposed recess defining thereabouts marginal side edge portions of the undersurface so that as the tool wears during use, the undersurface does not adopt a convex undersurface that would adversely affect operation of the tool.

4. A soil working tool according to claim 1 wherein the tool includes a generally flat undersurface having outer downwardly inclined edges which form on opposite side of the tool lowermost points of the undersurface so that the undersurface of the tool substantially maintains its generally flat shape as the downwardly inclined edges wear.

5. A soil working tool according to claim 1 wherein the tool is double ended and operatively reversible.

6. A soil working tool according to claim 1 wherein the tool is double ended and operatively reversible, the tool having opposite toe sections and adjacent confronting heel sections with a central bridging portion, the bridging portion having the said means for removably securing the tool to the shank, the bridging portion having a channel recess adapted to straddle the shank when the tool is operatively secured to the shank.

7. A soil working tool operatively secured to an upright shank and having a relatively narrow deep body including a leading toe section diverging rearwardly to a clearly defined heel, the tool having an upper end portion above the heel and having an upright inclined rearwardly extending ridge extending from a position at or adjacent to the toe section to a position at or adjacent to the upper end of the tool, the ridge in use being disposed in a vertical plane with the toe section merging into the ridge so that as the tool advances through the soil, the toe section and ridge co-act to simultaneously fracture the soil and give rise to a zone of vertical breaking in the soil above the toe section and about which the soil is progressively divided by the ridge as the tool advances through the soil.

8. A soil working tool according to claim 7 including means for securing a rear portion of the tool to the shank comprising recessed through holes formed as longitudinally spaced transverse slots extending across the ridge, the slots having opposed upwardly tapered side walls extending upwardly from a relatively wide base wall to the ridge, the base wall of each slot having a through hole and the slots being sufficiently deep so that bolts passing through the holes and used to secure the tool to the shank have their heads protected by the side walls of the slots as the tool advances through the soil.

9. A soil working tool according to claim 7 including a lower surface set at an angle of not more than 5° to the horizontal.

10. A soil working tool according to claim 7 wherein the tool includes an undersurface having a centrally disposed recess extending from the heel toward the toe section defining thereabouts marginal side edge portions of the undersurface so that as the tool wears during use, the undersurface does not adopt a convex undersurface that would adversely affect operation of the tool.

11. A soil working tool according to claim 7 wherein the heel includes an undersurface having inclined bilateral marginal side edge portions, outer edges of which form lowermost points of the undersurface so that the tool substantially maintains its shape as it wears.

12. A soil working tool according to claim 7 wherein the tool is double ended and operatively reversible.

13. A soil working tool according to claim 8 wherein the tool is double ended and operatively reversible, the tool having opposite toe sections and adjacent confronting heel sections with a central bridging portion, the bridging portion having the said means for removably securing the tool to the shank, the bridging portion having a channel recess adapted to straddle the shank when the tool is operatively secured to the shank.

14. A soil working tool operatively secured to a shank comprising a streamlined curved body having a relatively wide rear portion and a longitudinally extending concave centrally disposed relatively narrow upright ridge, the ridge extending substantially monotonically rearwardly and upwardly along a major portion of the length of the body, the body being equipped with means for securing the rear portion of the tool to a shank so the tool extends marginally outside of and covers a front lower end portion of the shank, the body having a lower portion comprising a leading toe section diverging rearwardly and generally horizontally to a relatively broad heel, an upper section above the heel and bilateral transversely curved concave side faces extending from the ridge to the rear portion the side faces in use being adapted to progressively displace soil either side of the tool.

15. A soil working tool according to claim 14 wherein the means for securing the rear portion to the shank comprises recessed through holes formed as longitudinally spaced transverse slots extending across the ridge, the slots having opposed upwardly tapered side walls extending upwardly from a relatively wide base wall to the ridge, the base wall of each slot having a through hole and the slots being sufficiently deep so that bolts passing through the holes and used to secure the tool to the shank have their heads protected by the side walls of the slots as the tool advances through the soil.

16. A soil working tool according to claim 14 including a lower surface set at an angle of not more than 5° to the horizontal.

17. A soil working tool according to claim 14 wherein the tool includes an undersurface having a centrally disposed recess extending from the heel toward the toe section defining thereabouts marginal side edge portions of the undersurface so that as the tool wears during use, the undersurface does not adopt a convex undersurface that would adversely affect operation of the tool.

18. A soil working tool according to claim 14 wherein the tool includes a generally flat undersurface having outer downwardly inclined edges which form on opposite sides of the tool lowermost points of the undersurface so that the underface tool substantially maintains its generally flat shape as the downwardly inclined edges wear.

19. A soil working tool according to claim 14 wherein the tool is double ended and operatively reversible.

20. A soil working tool according to claim 14 wherein the tool is double ended and operatively reversible, the tool having opposite toe sections and adjacent confronting heel sections with a central bridging portion, the bridging portion having the means for securing the rear portion of the tool to the shank, the rear portion of the shank having a channel recess adapted to straddle the shank when the tool is operatively secured to the shank.

* * * * *